(12) United States Patent
Cheng et al.

(10) Patent No.: US 11,340,601 B2
(45) Date of Patent: May 24, 2022

(54) DISTURBANCE SOURCE POSITIONING METHOD

(71) Applicant: Industrial Technology Research Institute, Hsinchu (TW)

(72) Inventors: Yi-Cheng Cheng, Hsinchu (TW); Chun-Yen Chen, Taoyuan (TW); Chen-Kai Hsu, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 372 days.

(21) Appl. No.: 16/590,385

(22) Filed: Oct. 2, 2019

(65) Prior Publication Data

US 2020/0125082 A1    Apr. 23, 2020

(30) Foreign Application Priority Data

Oct. 22, 2018  (TW) .................. 107137239

(51) Int. Cl.
*G05B 23/02* (2006.01)
*G05B 13/02* (2006.01)
*G06N 20/00* (2019.01)

(52) U.S. Cl.
CPC ..... *G05B 23/0248* (2013.01); *G05B 13/0265* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,719,788 A | * | 2/1998 | Seborg | G05B 5/01 700/28 |
| 5,768,121 A | * | 6/1998 | Federspiel | F24F 11/006 700/28 |
| 2007/0150079 A1 | * | 6/2007 | Blevins | G05B 23/0251 700/41 |
| 2008/0167842 A1 | | 7/2008 | Cochran et al. | |
| 2009/0084180 A1 | * | 4/2009 | Yoshida | G01F 1/8422 73/504.02 |

(Continued)

FOREIGN PATENT DOCUMENTS

| | | |
|---|---|---|
| CN | 102411118 | 4/2012 |
| CN | 102520708 | 6/2012 |

(Continued)

OTHER PUBLICATIONS

Duan et al., "Methods for Root Cause Diagnosis of Plant-Wide Oscillations," AIChE, 2014, 16pg. (Year: 2014).*

(Continued)

*Primary Examiner* — Ryan D. Coyer
(74) *Attorney, Agent, or Firm* — JCIPRNET (57) ABSTRACT

A disturbance source positioning method for positioning disturbance sources in a system including a plurality of nodes is provided. The method includes the following steps: grouping the plurality of nodes into a plurality of node groups based on an oscillation feature; establishing an in-group causality of the plurality of node groups based on a successive order of a coherent oscillation component; selecting at least one candidate group from the plurality of node groups based on the in-group causality; and positioning at least one disturbance source node in each candidate group.

9 Claims, 8 Drawing Sheets

(56) References Cited

U.S. PATENT DOCUMENTS

| | | | | |
|---|---|---|---|---|
| 2014/0324369 | A1* | 10/2014 | Yang | G01R 31/086 702/59 |
| 2016/0098647 | A1 | 4/2016 | Nixon et al. | |
| 2018/0095123 | A1* | 4/2018 | Biswas | G01R 25/005 |

FOREIGN PATENT DOCUMENTS

| | | |
|---|---|---|
| CN | 102944798 | 2/2013 |
| CN | 101652730 | 3/2013 |
| CN | 103913632 | 7/2014 |
| CN | 104269866 | 1/2015 |
| CN | 103178519 | 9/2015 |
| CN | 105119286 | 12/2015 |
| CN | 105738772 | 7/2016 |
| CN | 106340889 | 1/2017 |
| CN | 106647691 | 5/2017 |
| CN | 107871197 | 4/2018 |
| TW | I608365 | 12/2017 |
| TW | 202016560 | 5/2020 |
| WO | 2013041440 | 3/2013 |
| WO | 2016138750 | 9/2016 |

OTHER PUBLICATIONS

"Office Action of Taiwan Related Application, Application No. 108144560", dated Aug. 19, 2020, p. 1-p. 3.

Naveeta Mehta, et al., "A Review of Clustering Techiques in Various Applications for Effective Data Mining", International Journal of Research in IT and Management, vol. 1, No. 2, Jun. 2011, pp. 50-66.

Amit Saxena, et al., "A Review of Clustering Techniques and Developments", Neurocomputing, Jul. 4, 2017, pp. 664-681.

Neha Soni, et al., "Categorization of Several Clustering Algorithms from Different Perspective: A Review", International Journal of Advanced Research in Computer Science and Software Engineering, vol. 2, Issue 8, Aug. 2012, pp. 63-68.

Christopher J. C. Burges, "Dimension Reduction: A Guided Tour", Foundations and Trends® in Machine Learning, vol. 2, No. 4, Jan. 2010, pp. 1-64.

Laurens Van Der Maaien, et al., "Dimensionality Reduction: A Comparative Review", Tilburg Centre for Creative Computing Technical Report, Oct. 26, 2009, pp. 1-36.

Laurens Van Der Maaten, et al., "Visualizing Data using t-SNE", Journal of Machine Learning Research, vol. 9, Nov. 8, 2008, pp. 2579-2605.

Margret Bauer, et al., "Finding the Direction of Disturbance Propagation in a Chemical Process Using Transfer Entropy", IEEE Transactions on Control Systems Technology, vol. 15, No. 1, Jan. 2007, pp. 12-21.

Fan Yang, et al., "Signed Directed Graph Based Modeling and Its Validation From Process Knowledge and Process Data", International Journal of Applied Mathematics and Computer Science, vol. 22, No. 1, 2012, pp. 1-13.

Tao Yuan, et al., "Root cause diagnosis of plant-wide oscillations using Granger causality", Preprints of the 8th IFAC Symposium on Advanced Control of Chemical Processes, Jul. 10-13, 2012, pp. 1-6.

Christian Kühnert, et al., "Data-Driven Methods for the Detection of Causal Structures in Process Technology", Machines, Nov. 4, 2014, pp. 255-274.

Ping Duan, et al., "Methods for Root Cause Diagnosis of Plant-Wide Oscillations", AIChE Journal, vol. 60, No. 6, Jun. 2014, pp. 2019-2034.

"Office Action of China Counterpart Application", dated Sep. 2, 2021, p. 1-p. 11.

* cited by examiner

DISTURBANCE SOURCE POSITIONING METHOD

CROSS-REFERENCE TO RELATED APPLICATION

This application claims the priority benefit of Taiwan application no. 107137239, filed on Oct. 22, 2018. The entirety of the above-mentioned patent application is hereby incorporated by reference herein and made a part of this specification.

BACKGROUND

Technical Field

The disclosure relates to a disturbance source positioning method, and particularly relates to a disturbance source positioning method capable of positioning at least one disturbance source.

Description of Related Art

In a plant, failure of valve members, improper adjustment of controller parameters or external disturbances may all cause oscillation of loops in the plant. There are a large number of loops in the plant, and when one of the loops has a loop oscillation, through mutual transmission between the loops, the loop oscillation may affect the entire plant to cause a plant wide loop oscillation. If a plant wide loop oscillation occurs, it may cause a poor operation of plant equipment and even unit jump, resulting in a quality decline of products and an increase of energy consumption.

In order to prevent plant wide loop oscillation, it is necessary to find the disturbance source that is causing the loop oscillation. However, since there are a large number of loops in the plants today, it would take a lot of manpower and time to detect the root cause of the loop disturbance. Especially under the circumstances when multiple disturbance sources occur at the same time and the loops interact with each other, it will be more difficult to diagnose the disturbance sources. Therefore, how to quickly and accurately diagnose the loop disturbance source and reduce the manpower and time cost required to detect the cause of the oscillation is an urgent problem to be solved in the field.

SUMMARY

The disclosure is directed to a disturbance source positioning method, which is capable of mitigating a computation burden and positioning a plurality of disturbance sources.

An embodiment of the disclosure provides a disturbance source positioning method for positioning disturbance sources from a plurality of nodes in a system. The method includes the following steps: grouping the plurality of nodes into a plurality of node groups based on an oscillation feature; establishing an in-group causality of the plurality of node groups based on a successive order of a coherent oscillation component; selecting at least one candidate group from the plurality of node groups based on the in-group causality; and positioning at least one disturbance source node in each one of the at least one candidate group.

Based on the above description, in the disturbance source positioning method provided by the embodiment of the disclosure, a plurality of nodes in the system is first grouped according to an oscillation feature thereof, and the in-group causality is established according to the successive order of the coherent oscillation component of every two groups, so as to identify the candidate groups possibly including the disturbance sources. Thereafter, a disturbance source node in each candidate group is identified. In this way, a plurality of disturbance sources in the system is positioned. Moreover, complexity of computation may be reduced when the system is large, and manpower and time required for detecting the oscillation disturbance source are effectively reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

A disturbance source positioning method provided by an embodiment of the disclosure adopts a machine learning method to first group a large amount of nodes (for example, control loops) in a system (for example, a plant area) into a plurality of node groups, and then further analyze an in-group causality (for example, an oscillation transmission relationship) of the node groups to find out candidate groups possibly including disturbance sources. Then, process analysis is performed to the candidate groups to position the possible disturbance source in each of the candidate groups. In this way, a computation burden is reduced, and meanwhile a plurality of disturbance sources is positioned.

The disturbance source positioning method of the disclosure is adapted to a computation device. The computation device is, for example, an electronic device having a computation function such as a personal computer (PC), a work station, a server, a notebook, a personal digital assistant (PDA), a smart phone, a tablet PC, etc., which is not limited by the disclosure. In the embodiment, the computation device may execute program codes implemented in form of software or firmware, so as to execute the disturbance source positioning method of the disclosure to position disturbance sources in a system including a plurality of nodes. Detailed steps of the disturbance source positioning method of the disclosure are described in following embodiments with reference to figures.

Figure 1:
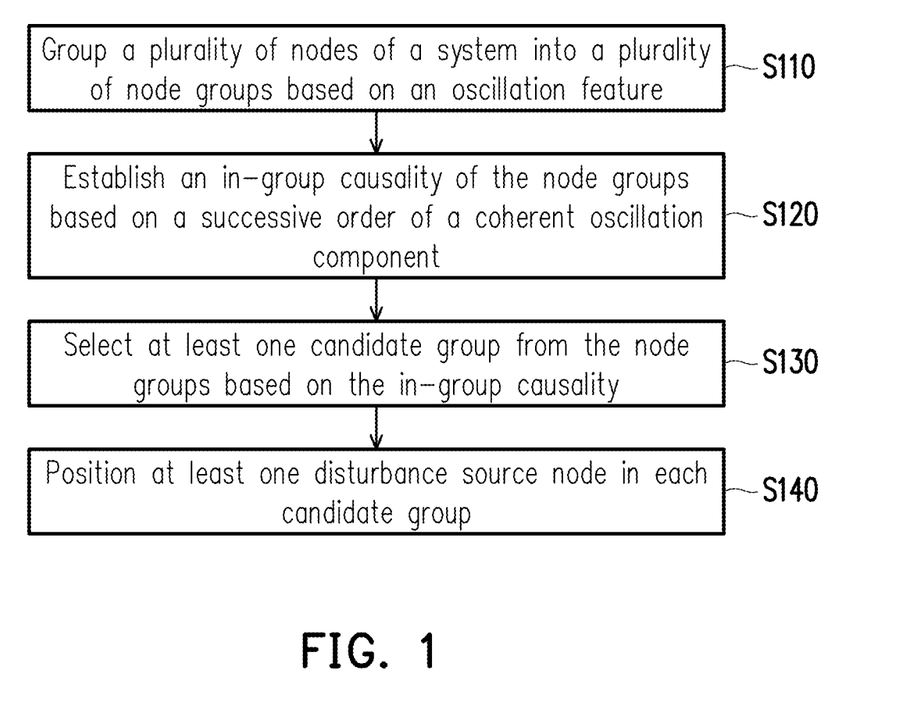
FIG. 1 is a flowchart illustrating a disturbance source positioning method according to an embodiment of the disclosure.

FIG. 1 is a flowchart illustrating a disturbance source positioning method according to an embodiment of the disclosure.

Referring to FIG. 1, the disturbance source positioning method is adapted to position a disturbance source from a plurality of nodes of a system, and includes steps S110 to S140. In the step S110, the nodes are grouped into a plurality of node groups based on an oscillation feature. Then, in the step S120, an in-group causality of the node groups is established based on a successive order of a coherent oscillation component. Then, in the step S130, at least one candidate group is selected from the node groups based on the in-group causality. Finally, in the step S140, at least one disturbance source node is positioned in each candidate group.

In the step S110, the computation device may group the plurality of nodes of the system into a plurality of node groups based on the oscillation features. To be specific, an original signal is, for example, an oscillation signal from the node in a time domain, and the oscillation feature is a feature related to oscillation in the original signal, for example, a main frequency, etc., which are not limited by the disclosure. Therefore, the computation device may first collect a plurality of original signals of the plurality of nodes of the system, and extract a feature related to oscillation in the original signals to serve as the oscillation feature, and then group the nodes based on the oscillation feature, for example, to group the nodes with the original signals of the same main frequency into the same node group, etc., but the disclosure is not limited thereto.

Figure 2:
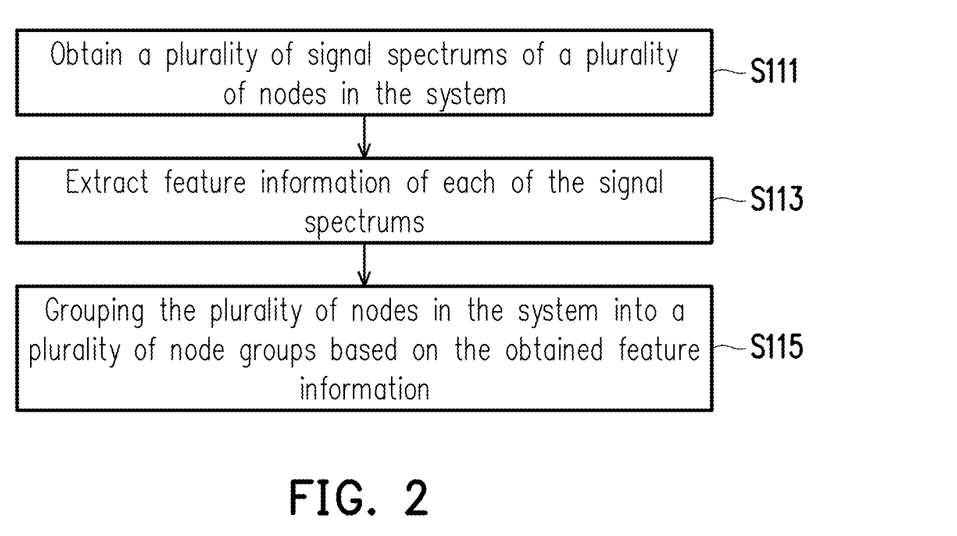
FIG. 2 is a flowchart illustrating a process of grouping a plurality of nodes of a system into a plurality of node groups based on an oscillation feature.

FIG. 2 is a flowchart illustrating a process of grouping a plurality of nodes of the system into a plurality of node groups based on oscillation feature.

Referring to FIG. 2, in some embodiments, the step S110 includes steps S111 to S115. First, in the step S111, a plurality of signal spectrums of the nodes is obtained, in the step S113, feature information of each signal spectrum is extracted, and in the step S115, the nodes are grouped into the node groups based on the feature information.

In the step S111, the computation device may obtain the plurality of signal spectrums of the plurality of nodes in the system. In some embodiments, the computation device may transform the original signal (for example, a time domain signal) of each of the nodes into a signal spectrum by using Fourier transform after collecting the original signals of the plurality of nodes of the system. However, the disclosure is not limited thereto, and those skilled in the art may use other transform method to transform the original signal into the signal spectrum according to an actual usage requirement.

In the step S113, the computation device extracts the feature information of each of the signal spectrums. In some embodiments, the computation device may use a linear dimensionality reduction method or a nonlinear dimensionality reduction method to extract the feature information of each signal spectrum. In detail, the linear dimensionality reduction, for example, includes Principle Component Analysis (PCA), and the nonlinear dimensionality reduction, for example, includes kernel PCA, Multi-Dimensional Scaling (MDS), Locally Linear Embedding (LLE) and t-distributed Stochastic Neighbor Embedding (t-SNE), etc., but the disclosure is not limited thereto. It should be noted that the feature information obtained by extracting the signal spectrum in different ways will also be different, so the disclosure does not limit the specific content of the feature information. Moreover, those skilled in the art may obtain introduction of the aforementioned linear dimensionality reduction method and the nonlinear dimensionality reduction method from related literatures, and details thereof are not repeated.

After obtaining the feature information of the signal spectrum, in the step S115, the computation device groups the plurality of nodes in the system into a plurality of node groups based on obtained the feature information. In some embodiments, based on the feature information, the computation device may adopt a machine learning method to group the nodes. In detail, grouping methods in the machine learning field include partitional clustering, hierarchical clustering, density-based clustering and network clustering, etc., where the partitional clustering, for example, includes algorithms of k-means, k medoids, fuzzy c-means, etc., the hierarchical clustering, for example, includes agglomerative and divisive algorithms, etc., the density-based clustering includes Density-Based Spatial Clustering of Applications with Noise (DBSCAN), etc., and the network clustering, for example, includes Self-Organizing Map (SOM), etc. However, as long as the plurality of nodes may be grouped according to the oscillation feature or feature information, the disclosure does not limit the specific algorithm used for grouping the nodes.

It should be noted that the disclosure does not limit the number of groups of the node groups. In some embodiments, the number of groups may be evaluated by using Davies-Bouldin Index (DBI), but the disclosure is not limited thereto.

Referring to FIG. 1, in the step S120, the computation device establishes the in-group causality of the plurality of node groups based on the successive order of the coherent oscillation component. To be specific, one oscillation component is, for example, a component of a certain frequency in the oscillation signal; the coherent oscillation component is, for example, a component of a certain frequency common to the two oscillating signals; and the successive order of the coherent oscillation component is, for example, an occurrence time sequence of two coherent oscillation components of two oscillation signals. Therefore, a transmission direction of oscillation may be learned from the successive order of the coherent oscillation component, and the in-group causality is used for representing an oscillation transmission direction between the node groups.

It should be noted that since the plurality of nodes in the same node group have the same or similar oscillation feature or feature information, the computation device may first generate a representative signal of each node group based on the plurality of original signals of the plurality of nodes in each node group, and then determines an oscillation component of each node group according to the representative signal. In some embodiments, the computation device, for example, randomly selects the oscillation signal of one of the nodes from the node group to serve as the representative signal. In some embodiments, the computation device, for example, calculates an average of the oscillation signals of all of the nodes in the node group to serve as the representative signal. However, the disclosure is not limited thereto.

For example, it is assumed that a representative signal $OS(t)$ of a first node group is represented as:

$$OS(t) = \sin(2\pi \times 5 \times t) + \sin(2\pi \times 12 \times t) + \text{noise},$$

where "noise" is used for representing noise. Therefore, the oscillation signal OS(t) includes two oscillation components with frequencies of 5 Hz and 12 Hz. It is assumed that a representative signal OS'(t) of a second node group is represented as:

$$OS'(t)=\sin(2\pi \times 5 \times (t-t0))+\text{noise},$$

so that the oscillation signal OS'(t) also includes an oscillation component with the frequency of 5 Hz. Therefore, the coherent oscillation component of the representative signals OS(t) and OS'(t) is the oscillation component of 5 Hz.

Moreover, since an occurrence time of the oscillation component with the frequency of 5 Hz in the representative signal OS(t) of the first node group is earlier (for example, earlier by to second) than that of the oscillation component with the frequency of 5 Hz in the representative signal OS'(t) of the second node group, the oscillation between the first node group and the second node group is transmitted from the first node group to the second node group, and the aforementioned oscillation transmission direction is the in-group causality between the first node group and the second node group. In some embodiments, since a system oscillation transmission speed is very fast, a difference between the occurrence time of the two coherent oscillation components of the two node groups is smaller than a half cycle of the coherent oscillation component (taking the coherent oscillation component of 5 Hz as an example, $t_0<0.1$ second), but the disclosure is not limited thereto.

Figure 3:
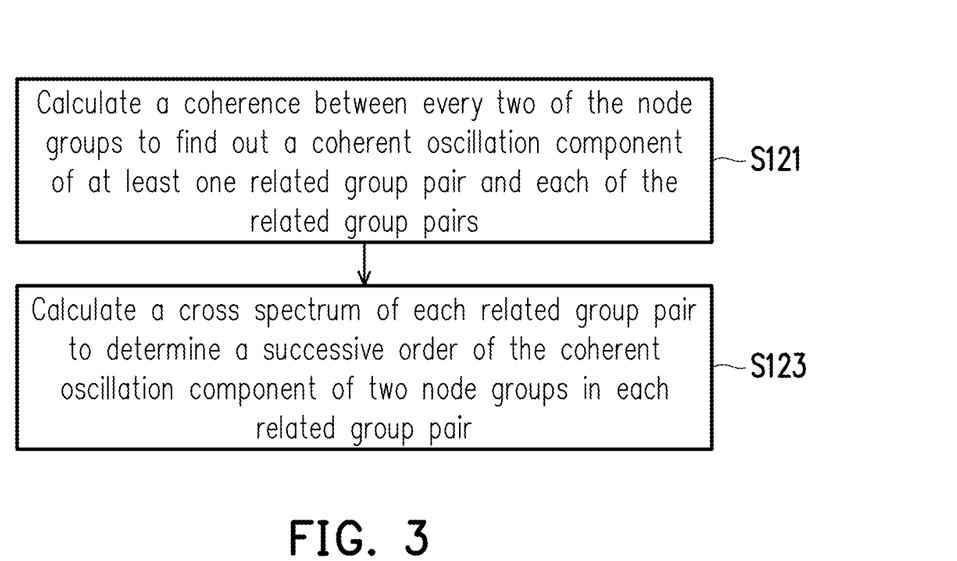
FIG. 3 is a flowchart illustrating an in-group causality of a plurality of node groups established based on a successive order of a coherent oscillation component according to an embodiment of the disclosure.

FIG. 3 is a flowchart illustrating an in-group causality of a plurality of node groups established based on a successive order of a coherent oscillation component according to an embodiment of the disclosure.

Referring to FIG. 3, in some embodiments, the step S120 includes a step S121 and a step S123. In the step S121, a coherence between every two of the node groups is calculated to find out a coherent oscillation component of at least one related group pair and each of the related group pairs. Then, in the step S123, a cross spectrum of each related group pair is calculated to determine a successive order of the coherent oscillation component of two node groups in each related group pair.

In the step S121, the computation device may calculate the coherence between every two node groups to find out a plurality of related group pairs and the coherent oscillation components of each of the related group pairs. Generally, the coherence is also referred to as Magnitude Squared Coherence (MSC). In some embodiments, the computation device may, for example, calculate the coherence between every two node groups according to the representative signal of each node group, and set a threshold to determine whether every two node groups have a coherent oscillation component there between. If the two node groups have the coherent oscillation component there between, such two node groups belong to a related group pair, which represents that such two node groups have an in-group causality there between. It should be noted that those skilled in the art may learn the method of calculating the coherence between two signals from related literatures, and detail thereof is not repeated.

It should be noted that the disclosure does not limit the setting method of the aforementioned threshold. In some embodiments, the computation device may, for example, set a fixed threshold. In other embodiments, the computation device may, for example, set the threshold according to the calculated coherence.

Figure 4:
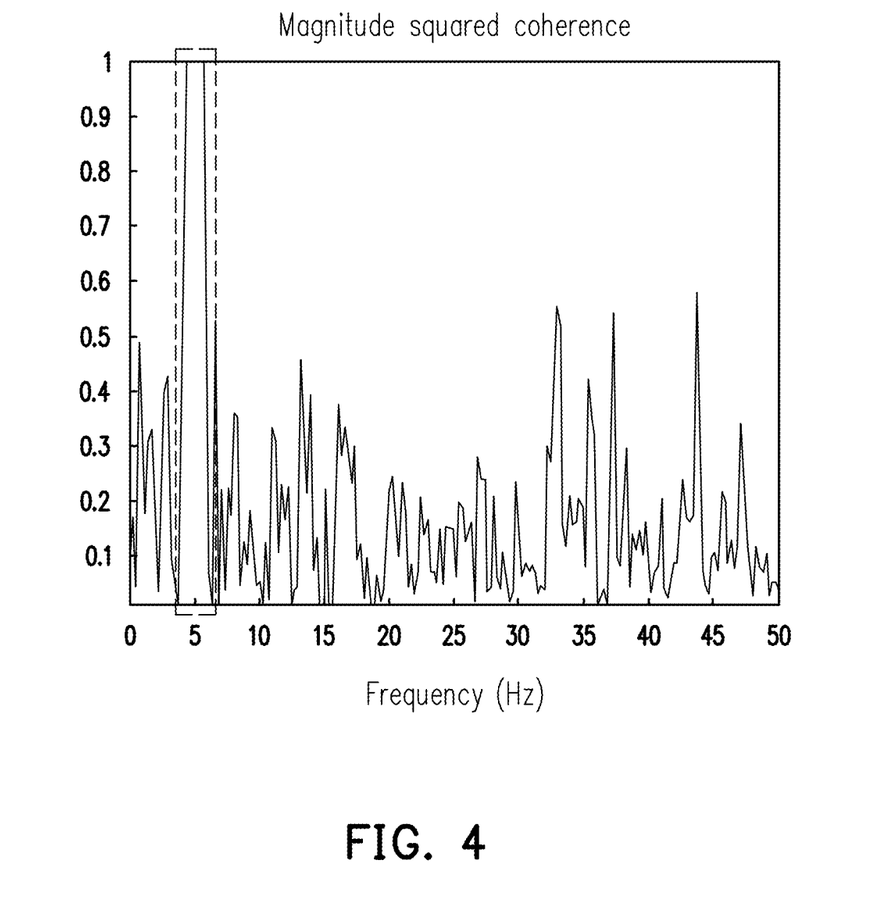
FIG. 4 is a schematic diagram of a coherence according to an embodiment of the disclosure.

FIG. 4 is a schematic diagram of a coherence according to an embodiment of the disclosure.

Referring to FIG. 4, after the computation device calculates the coherence between two node groups, the information of FIG. 4 is obtained, which includes coherences (the MSC) of each frequency component, and the coherences are between 0 and 1. For example, the computation device sets the threshold to 0.9, and if the coherence of a specific frequency component is greater than the threshold, it is regarded that the two node groups have a coherent oscillation component there between, and the coherent oscillation component is an oscillation component of the aforementioned specific frequency. Taking the information of FIG. 4 as an example, since the coherence of the frequency component of 5 Hz is 1, it represents that the coherent oscillation component exists between the two node groups. In other words, the two node groups belong to a related group pair, and respectively have the oscillation component of 5 Hz (i.e. the coherent oscillation component).

Referring to FIG. 3, in the step S123, the computation device calculates a cross spectrum of each related group pair to determine a successive order of the coherent oscillation component of two node groups in each related group pair. To be specific, from a cross spectrum phase of two signals, phase delays of the two signals at each frequency component may be obtained, so that in the step S121, after the coherent oscillation component of two representative signals of the two node groups are found, the successive order of the coherent oscillation component may be learned from the cross spectrum of the two representative signals.

Figure 5:
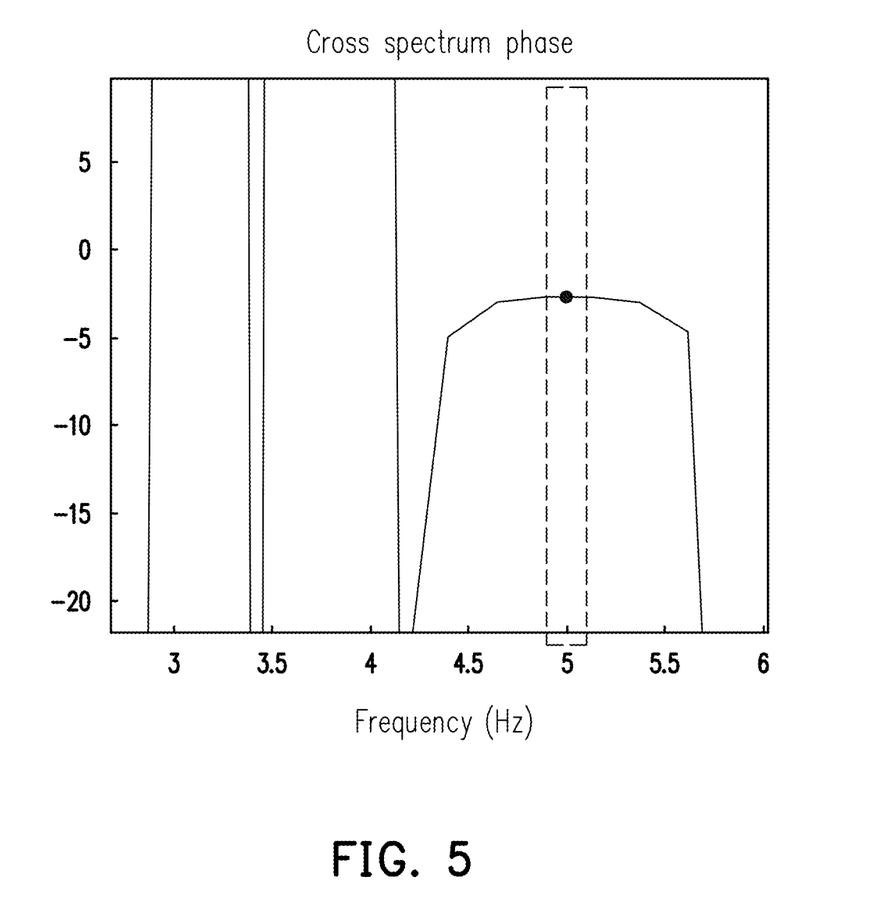
FIG. 5 is a schematic diagram of a cross spectrum phase according to an embodiment of the disclosure.

FIG. 5 is a schematic diagram of a cross spectrum phase according to an embodiment of the disclosure.

Referring to FIG. 5, after the computation device calculates the cross spectrum of one related group pair, the information shown in FIG. 5 is obtained, wherein the information includes phase delays of the two representative signals of the first node group and the second node group in the related group pair at each frequency component, so that as long as the phase delay of the coherent oscillation component of the two representative signals is found, the in-group causality of the first node group and the second node group is learned. For example, if the coherent oscillation component between the first node group and the second node group of the related group pair is the oscillation component of 5 Hz, according to a negative cross spectrum phase corresponding to the oscillation component of 5 Hz of FIG. 5, it is learned that the oscillation component of 5 Hz in the representative signal of the first node group is behind the oscillation component of 5 Hz in the representative signal of the second node group. Therefore, the computation device may learn that the oscillation is transmitted from the second node group to the first node group from the cross spectrum.

Referring to FIG. 1, in the step S130, the computation device may select at least one candidate group from the plurality of node groups based on the in-group causality. To be specific, after the in-group causality between the plurality of node groups is established, it is learned from which node groups the oscillation is transmitted to which node groups, and it is able to determine which node groups may have disturbance sources, and the node groups possibly including the disturbance sources are selected as the candidate groups.

In some embodiments, the computation device, for example, selects at least one candidate group from the plurality of node groups according to a predetermined rule based on the in-group causality. In detail, the aforementioned predetermined rule, for example, includes: if a certain node group does not receive the oscillation from other node groups, such node group is selected as the candidate group;

and if the number of oscillation frequencies output by a certain node group is greater than the number of oscillation frequencies received by the certain node group, such node group is selected as the candidate group.

To be specific, if a certain node group does not transmit oscillation to other node groups and does not receive oscillation from the other node groups, it represents that there may be no upstream or downstream relationship between the certain node group and other node groups, so that it is impossible to exclude the possibility that there is a disturbance source therein, and the certain node group is selected as a candidate group; if a certain node group only transmits an oscillation to the other node groups but does not receive any oscillation from the other node groups, it represents that one of the nodes therein probably generates the oscillation, so that the certain node group is selected as the candidate group; and if the number of oscillation frequencies output by a certain node group is greater than the number of oscillation frequencies received by the certain node group, it represents that some oscillation frequencies are probably generated from the certain node group, and the certain node group is selected as the candidate group. It should be noted that an oscillation transmission direction between two node groups may be learned from the in-group causality established in the step S120, and the oscillation frequency transmitted between the two node groups may be learned from the coherent oscillation component of the two node groups.

In the step S140, the computation device positions a disturbance source node in each candidate group. To be specific, when the candidate group only includes one node, the computation device positions such node as the disturbance source node. On the other hand, when the candidate group includes a plurality of nodes, the computation device, for example, performs process analysis to the plurality of nodes in the candidate group to position one of the nodes in the candidate group as the disturbance source node. In some embodiments, the computation device, for example, performs a topology-based process analysis to the plurality of nodes in the candidate group, where the topology-based process analysis, for example, includes a Granger causality test method, a transfer entropy method, a Bayesian network method and a cross-correlation method, etc., but the disclosure is not limited thereto. Since the number of nodes in each candidate group is far less than a total number of nodes in the system, a computation burden of the process analysis performed to each of the candidate groups is far less than a computation burden of the process analysis performed to the entire system.

In some embodiments, the computation device may also, for example, calculate a coherence and cross spectrum of every two nodes in the candidate group to find out an oscillation transmission direction of the plurality of nodes in the candidate group, so as to find out the disturbance source node. It should be noted that since to use the coherence and the cross spectrum to find out the oscillation transmission direction of the plurality of nodes in the candidate group results in finding out of the causality between the plurality of nodes, such method may be regarded as one of the topology-based process analysis methods.

In some embodiments, the computation device may also position the disturbance source node in the candidate group by integrating the aforementioned plurality of process analysis methods. The method of positioning the disturbance source node in each of the candidate groups is not limited by the disclosure, which may be implemented by those skilled in the art according to an actual requirement.

According to the processes of the disturbance source positioning methods introduced in the aforementioned description, the computation device may position at least one disturbance source node from the system including a plurality of nodes. Details of the aforementioned processes are introduced below with reference to figures.

Figure 6:
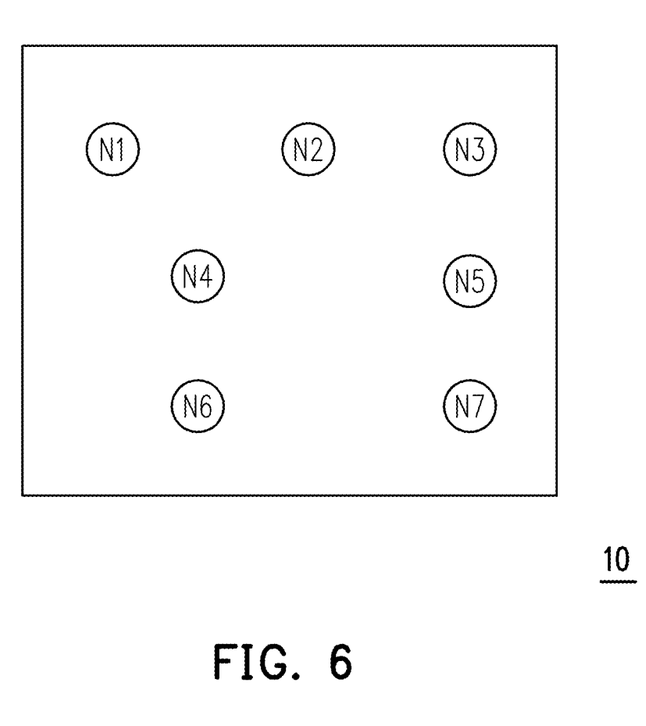
FIG. 6 is a schematic diagram of a system according to an embodiment of the disclosure.

FIG. 6 is a schematic diagram of a system according to an embodiment of the disclosure.

Referring to FIG. 6, the system 10, for example, includes a plurality of nodes N1 to N7. For example, the system 10 is a plant, and the plurality of nodes N1 to N7 are a plurality of control loops in the plant. It should be noted that for simplicity's sake, the embodiment of the disclosure takes 7 nodes as an example for description, but those skilled in the art should understand that the disclosure is not limited to the above example, namely, the disclosure does not limit the number of the nodes in the system.

Figure 7:
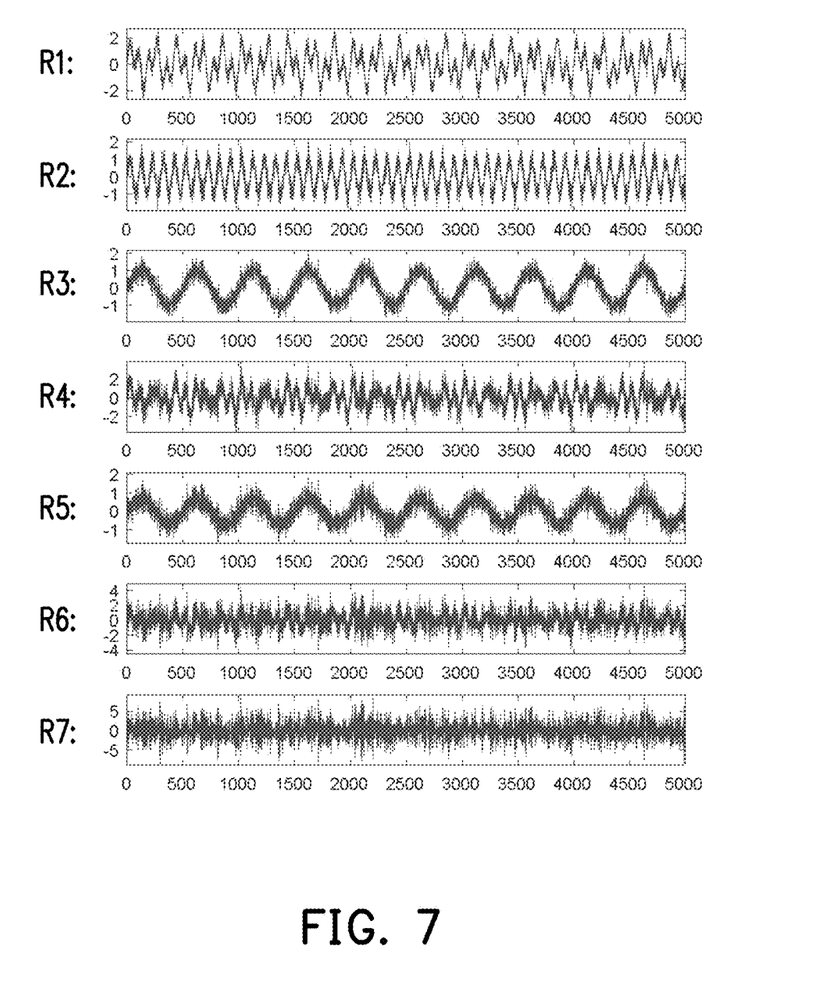
FIG. 7 is a schematic diagram of original signals according to an embodiment of the disclosure.
Figure 8:
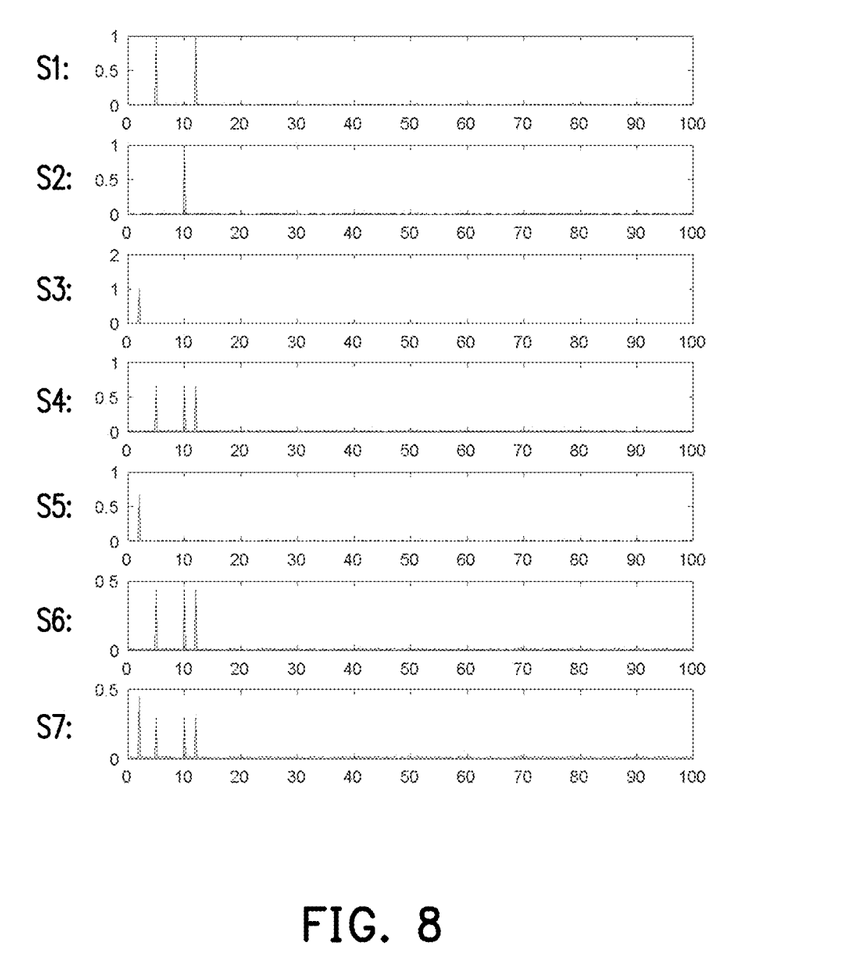
FIG. 8 is a schematic diagram of signal spectrums according to an embodiment of the disclosure.

FIG. 7 is a schematic diagram of original signals according to an embodiment of the disclosure. FIG. 8 is a schematic diagram of signal spectrums according to an embodiment of the disclosure.

Referring to FIG. 7 and FIG. 8, the computation device may respectively obtain original signals R1 to R7 of the plurality of control loops (i.e. the nodes N1 to N7), and transform the original signals R1 to R7 into signal spectrums S1 to S7 by Fourier transform. For example, the original signals R1 to R7 of each of the nodes N1 to N7 are, for example, outputs of each of the control loops in the plant at each time point, and oscillations of the original signals R1 to R7 represent oscillation of the outputs of each of the control loops along with time, but the disclosure is not limited thereto.

Figure 9:
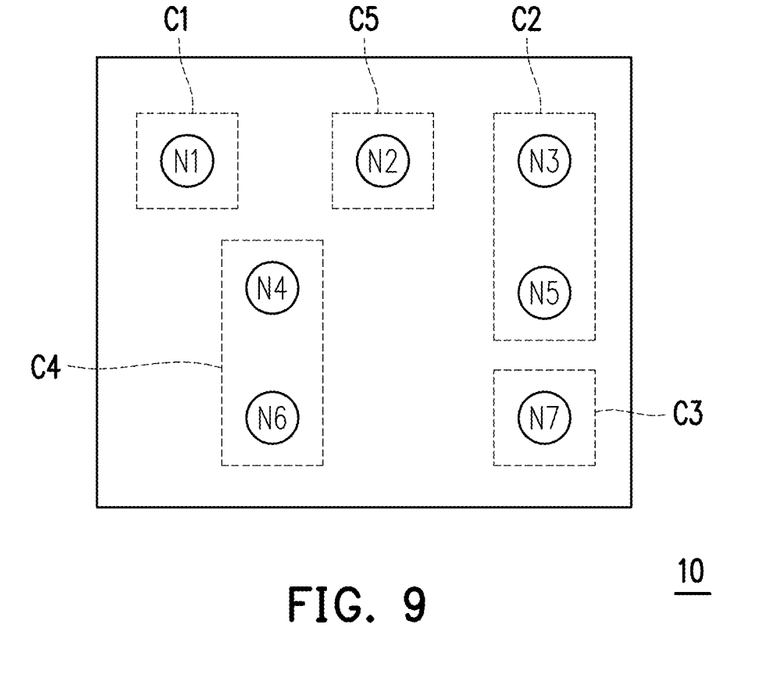
FIG. 9 is a schematic diagram of a grouping result of node groups according to an embodiment of the disclosure.

FIG. 9 is a schematic diagram of a grouping result of the node groups according to an embodiment of the disclosure.

Through the aforementioned grouping process, the computation device may, for example, use the Principle Component Analysis (PCA) to extract feature information of the signal spectrums S1 to S7, and use the k-means algorithm to group the nodes N1 to N7 into a plurality of node groups C1 to C5 according to the feature information of the signal spectrums S1 to S7. The node group C1 includes the node N1, and according to the signal spectrum S1, it is learned that the original signal R1 includes two oscillation components with frequencies of 5 Hz and 12 Hz. The node group C2 includes the nodes N3 and N5, and according to the signal spectrums S3 and S5, it is learned that the original signals R3 and R5 all include the oscillation component with a frequency of 2 Hz. The node group C3 includes the node N7, and according to the signal spectrum S7, it is learned that the original signal R7 includes four oscillation components with frequencies of 2 Hz, 5 Hz, 10 Hz and 12 Hz. The node group C4 includes the nodes N4 and N6, and according to the signal spectrums S4 and S6, it is learned that the original signals R4 and R6 all include three oscillation components with frequencies of 5 Hz, 10 Hz and 12 Hz. The node group C5 includes the node N2, and according to the signal spectrum S2, it is learned that the original signal R2 includes an oscillation component with the frequency of 10 Hz. Therefore, the nodes belonging to the same node group have the oscillation component of the same frequency.

After the fifth node groups C1 to C5 are grouped, the computation device, for example, respectively takes the original signal S1 as the representative signal of the node group C1; takes the original signal S3 as the representative signal of the node group C2; takes the original signal S7 as the representative signal of the node group C3; takes the original signal S4 as the representative signal of the node group C4; and takes the original signal S2 as the representative signal of the node group C5.

Thereafter, the computation device may, for example, calculate the coherence between each two node groups according to the aforementioned representative signals to find out the coherent oscillation components between a plurality of related group pairs and each of the related group pairs, and then calculates a cross spectrum of each of the related group pairs to determine a successive order of the coherent oscillation component in each of the related group pairs. The aforementioned calculation result may be presented by a following Table 1:

TABLE 1

|    | C1 | C2 | C3 | C4 | C5 |
|----|----|----|----|----|----|
| C1 |    | X  | @5 Hz (+0.011) @12 Hz (+0.025) | @5 Hz (+0.0047) @12 Hz (+0.0071) | X |
| C2 | X  |    | @2 Hz (+0.001) | X | X |
| C3 | @5 Hz (−0.011) @12 Hz (−0.025) | @2 Hz (−0.001) |    | @5 Hz (−0.006) @10 Hz (−0.012) @12 Hz (−0.018) | @10 Hz (−0.020) |
| C4 | @5 Hz (−0.0047) @12 Hz (−0.0071) | X | @5 Hz (+0.006) @10 Hz (+0.012) @12 Hz (+0.018) |    | @10 Hz (−0.007) |
| C5 | X | X | @10 Hz (+0.020) | @10 Hz (+0.007) |    |

Taking "@5 Hz(+0.011)" of a first row and a third column of the Table 1 as an example, "@5 Hz", for example, represents that the node group C1 and the node group C3 have the coherent oscillation component of 5 Hz there between, and a plus sign in "(+0.011)", for example, represents that the coherent oscillation component of 5 Hz of the node group C1 is ahead of the coherent oscillation component of 5 Hz of the node group C3, so that the oscillation of 5 Hz is transmitted from the node group C1 to the node group C3; taking "@5 Hz(−0.0047)" of a fourth row and a first column of the Table 1 as an example, "@5 Hz", for example, represents that the node group C4 and the node group C1 have the coherent oscillation component of 5 Hz there between, and a minus sign in "(−0.0047)", for example, represents that the coherent oscillation component of 5 Hz of the node group C4 is behind of the coherent oscillation component of 5 Hz of the node group C1, so that the oscillation of 5 Hz is transmitted from the node group C1 to the node group C4, and the others are deduced by analogy.

Figure 10:
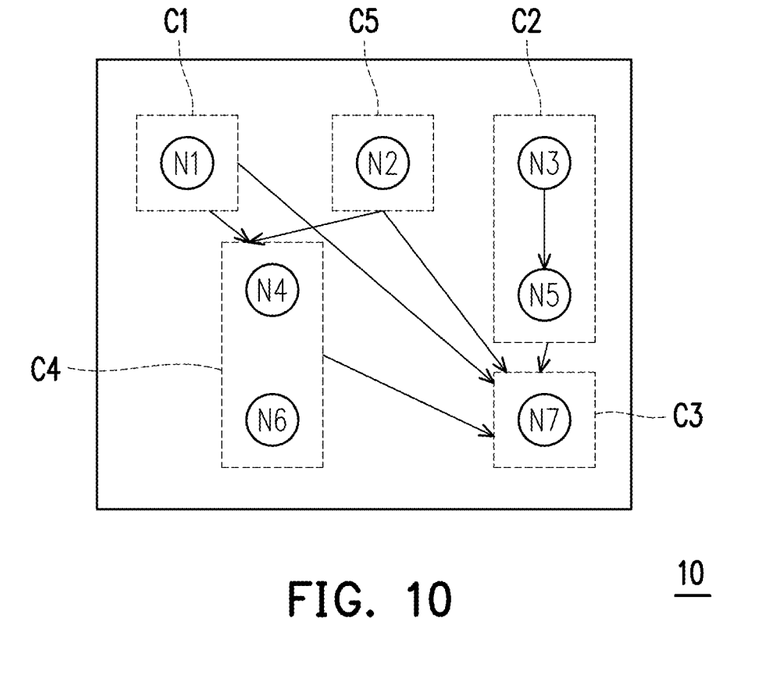
FIG. 10 is a schematic diagram of an in-group causality according to an embodiment of the disclosure.

FIG. 10 is a schematic diagram of an in-group causality according to an embodiment of the disclosure.

According to the computation result shown in the Table 1, the computation device may, for example, establish the in-group causality as shown in FIG. 10, where the arrows are used for representing oscillation transmission directions. According to the in-group causality shown in FIG. 10, the computation device, for example, selects at least one candidate group from the node groups C1 to C5 according to the predetermined rule introduced in the aforementioned paragraphs.

Referring to FIG. 10, since the node groups C1, C2 and C5 are all complied with the condition of "a certain node group does not receive the oscillation from other node groups, and such node group is selected as the candidate group", the computation device may select the node groups C1, C2 and C5 as candidate groups.

Finally, the computation device may respectively position one disturbance source node in the node groups C1, C2 and C5. Since the node groups C1 and C5 respectively include one node only, the computation device may directly position the node N1 in the node group C1 and the node N2 in the node group C5 as the disturbance source nodes. On the other hand, the computation device, for example, adopts the Granger causality test method to establish a topology relationship between the nodes N3 and N5 in the node group C2, and accordingly positions the node N3 as the disturbance source node.

Therefore, the computation device may positions three nodes N1, N2 and N3 as the possible disturbance sources from the seven nodes N1 to N7 of the system 10. For example, the computation device positions three control loops (i.e. the three nodes N1, N2 and N3) in the plant as possible disturbance sources by using the method provided by the embodiment of the disclosure. In this way, an operator may only detect the three devices positioned by the computation device, so as to find out an actual disturbance source to perform corresponding processing, which saves a lot of manpower and time.

It should be noted that the aforementioned embodiments are only illustrative for the method for positioning the disturbance sources provided by the disclosure, and the disclosure is not limited to the content of the aforementioned embodiments.

In summary, in the disturbance source positioning method provided by the embodiment of the disclosure, a plurality of nodes in the system is first grouped according to the oscillation feature thereof, and the in-group causality is established according to the successive order of the coherent oscillation component of every two groups, so as to identify the candidate groups possibly including the disturbance sources. Thereafter, a disturbance source node in each candidate group is identified. In this way, a plurality of disturbance sources in the system is positioned. Moreover, complexity of computation is also reduced when the system is large, and manpower and time required for detecting the oscillation disturbance sources are effectively reduced.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A disturbance source positioning method, for positioning disturbance sources from a plurality of nodes in a system, the disturbance source positioning method comprising:

grouping the nodes into a plurality of ode groups based on an oscillation feature;

establishing an in-group causality of the plurality of node groups based on a successive order of a coherent oscillation component, wherein the step of establishing the in-group causality of the plurality of node groups based on the successive order of the coherent oscillation component comprises:
  calculating a coherence between every two of the plurality of node groups to find out at least one related group pair and the coherent oscillation component of each of the at least one related group pair; and
  calculating a cross spectrum of each of the at least one related group pair to determine the successive order of the coherent oscillation component of the plurality of node groups in each of the at least one related group pair;
selecting at least one candidate group from the plurality of node groups based on the in-group causality; and
positioning at least one disturbance source node in each one of the at least one candidate group.

2. The disturbance source positioning method as claimed in claim 1, wherein the step of grouping the nodes into the plurality of node groups based on the oscillation feature comprises:
  obtaining a plurality of signal spectrums of the nodes;
  extracting feature information of each of the plurality of signal spectrums; and
  grouping the nodes into the plurality of node groups based on the feature information.

3. The disturbance source positioning method as claimed in claim 2, wherein the step of obtaining the plurality of signal spectrums of the nodes comprises:
  collecting a plurality of original signals of the nodes, wherein the plurality of original signals are time domain signals; and
  transforming the plurality of original signals into the plurality of signal spectrums.

4. The disturbance source positioning method as claimed in claim 2, wherein the step of extracting the feature information of each of the plurality of signal spectrums comprises:
  using linear dimensionality reduction or nonlinear dimensionality reduction to extract the feature information of each of the plurality of signal spectrums.

5. The disturbance source positioning method as claimed in claim 2, wherein the step of grouping the nodes into the plurality of node groups based on the feature information comprises:
  grouping the nodes into the plurality of node groups based on the feature information by using a machine learning method.

6. The disturbance source positioning method as claimed in claim 1, wherein the step of establishing the in-group causality of the plurality of node groups based on the successive order of the coherent oscillation component comprises:
  generating a representative signal of each of the plurality of node groups based on a plurality of original signals of the nodes in each of the plurality of node groups.

7. The disturbance source positioning method as claimed in claim 1, wherein the step of selecting the at least one candidate group from the plurality of node groups based on the in-group causality comprises:
  selecting the at least one candidate group from the plurality of node groups according to a predetermined rule based on the in-group causality, wherein the predetermined rule comprises:
    if one of the plurality of node groups does not receive oscillation from other of the plurality of node groups, the one of the plurality of node groups is selected as the at least one candidate group; and
    if a number of oscillation frequencies output by the one of the plurality of node groups is greater than a number of oscillation frequencies received by the one of the plurality of node groups, the one of the plurality of node groups is selected as the at least one candidate group.

8. The disturbance source positioning method as claimed in claim 1, wherein the step of positioning the at least one disturbance source node in each one of the at least one candidate group comprises:
  if the at least one candidate group comprises a single node, positioning the single node comprised in the at least one candidate group as the at least one disturbance source node; and
  if the at least one candidate group comprises a plurality of nodes, performing a process analysis to the plurality of nodes comprised in the at least one candidate group to position one of the plurality of nodes comprised in the at least one candidate group as the at least one disturbance source node.

9. The disturbance source positioning method as claimed in claim 8, wherein the process analysis comprises a topology-based process analysis.

* * * * *